2,888,351
SAUSAGES ENCASED IN IMPERMEABLE FILMS

Floyd C. Olson and Earl W. Turner, Madison, Wis., assignors to Oscar Mayer & Co., Inc., Chicago, Ill., a corporation of Illinois No Drawing. Application August 1, 1955
Serial No. 525,768

4 Claims. (Cl. 99—174)

This invention relates, generally, to innovations and improvements in the manufacture of sausages from muscle or skeletal tissue. It relates specifically to sausages made from muscle or skeletal tissues which are encased in impermeable casings or films as distinguished from sausages encased in permeable casings or films or from skinless sausages.

As is well known in the art, sausages originally were encased in so-called "natural casings" produced from the intestines of animals, particularly sheep and hogs. While these so-called "natural casings" are still used for certain types of sausages, e.g. pork sausage, a large proportion of the commercial production of sausages, such as wieners and Bologna, has for a number of years been encased in artificial regenerated cellulose casings. In the case of wieners, where the regenerated cellulose casings are stripped from the finished sausages, they are called skinless wieners. Both the natural casings and the regenerated cellulose casings are classified as "permeable." That is, they are filled with tiny pores and permit fairly rapid transmission and passage of moisture and gases (e.g. air and smoke).

While various impermeable films have been commercially available for several years such, for example, as Saran film, they could not be used for encasing sausages produced from muscle or skeletal tissue. These impermeable films such as Saran have been used to some extent for encasing sausages not made from muscle or skeletal tissue, notably liver sausage.

Despite the advantages which an impermeable sausage casing, such as a Saran casing, would have for the large volume sausage items made from muscle tissue, such as wieners and Bologna, it has not heretofore been practical to employ impermeable films as casings for such sausages. The primary reason why such impermeable films have not been previously used for sausage casings for sausages produced from muscle tissue, has been the inability to prevent fat-water separation from taking place within sausage products encased within impermeable films. A brief discussion of a more or less conventional procedure followed in the commercial production of sausages such as wieners or Bologna will facilitate the understanding of why fat-water separation would ordinarily take place in an impermeable casing.

In the commercial processing of meat for use in sausage and other ground meat products, the usual practice is to slaughter the animals and hang the carcasses in a cooler overnight maintained at a temperature in the range of about 28 to 45° F. Next day, or shortly thereafter, the meat is removed from the bones and then held in a cooler at a temperature of about 28 to 40° F. until ready for use. The meat is then coarse-ground and thereafter chopped with the other ingredients of the batter or recipe, depending upon the particular type of sausage or ground meat product being produced. During chopping, which may be performed in a so-called "silent cutter," it is common practice to add the required amount of water for the batter or recipe in the form of ice. The addition of ice serves the dual purpose of initially reducing the temperature of the batter in supplying water to the mixture.

After sausage batter has been prepared, it is stuffed into sausage casings and then heat processed in some manner. For example, it is conventional to stuff the sausage batter into moisture-permeable casings, either natural or synthetic, and then hang the stuffed sausages in a smokehouse. The hot gases in the smokehouse evaporate moisture from the surfaces of the sausages and there is a considerable loss of water through the sausage casing in the smoking operation. Therefore, the sausage maker incorporates a predetermined excess of water in the batter in order to compensate for such loss.

The permeable casings permit air and moisture to pass after the sausages have been produced. Entry of air and moisture into sausage products after production is undesirable because contamination and bacteria growth are permitted and the sausages dry out. Therefore, sausage products in permeable casings are perishable and must be refrigerated and even then they spoil in a short time.

While commercial films are available, e.g. Saran, which are impermeable to the transmission of moisture and gases, such films and casings have not been used successfully heretofore in preparing sausage products because they do not permit excess water to escape during heat processing. In this connection, it is to be pointed out that it is necessary, and even desirable, to incorporate at least a minimum amount of water in a sausage batter in order that it may be prepared and handled satisfactorily. However, this minimum amount of water exceeds the amount which the sausage is able to retain when it is heat-processed, e.g. smoked or cooked. Accordingly, in the conventional manufacture of sausage products wherein the meat is handled in the usual manner, it is necessary to permit a certain amount of water to escape during heat-processing, cooking or smoking, otherwise water-fat separation will occur which is unsightly and makes the sausages unmerchantable. In addition to being unsightly, the texture of a sausage product is poor when fat and water separation occurs.

It has been found possible in accordance with the present invention to treat some or all of the raw meat or skeletal tissue introduced into a sausage batter in such a way that the fat and water binding characteristics (i.e. emulsion-forming properties) of the ground meat are greatly enhanced or preserved. As a result of this discovery, it is possible to put out sausages made from muscle or skeletal tissue in impermeable casings without encountering fat and water separation whereas previously it was necessary to put the same products in permeable sausage casings. The invention depends upon the discovery that water-soluble polyphosphates which are neither toxic nor otherwise objectionable in the quantities required, when used to treat raw meat or when incorporated therewith, have the ability to greatly increase the fat and water binding properties thereof. As a result of this invention, it has become commercially feasible to produce sausages, such as Bologna, wieners, etc., in impermeable casings (e.g. Saran film) which are equal or superior in quality to conventional sausages of the same type produced in permeable casings when the latter is in fresh and peak condition. However, whereas the sausages in permeable casings deteriorate rapidly, even when kept under optimum refrigeration conditions, the sausages in the impermeable casings will keep in excellent condition for months.

It is believed that the incorporation of the water-soluble polyphosphates serves to prevent or offset the undesirable changes in muscle tissue that are associated with rigor mortis. Such changes degrade the quality of the meat for use in the manufacture of sausages. The changes which accompany rigor mortis or thaw rigor result in an appreciable loss of extractable myosin (Myosin A and Myosin B, i. e. natural actomyosin). Thus, there is approximately a 50% loss in the amount of myosin which can be extracted from beef muscle tissue after rigor mortis as compared with the pre-rigor meat. Since a certain concentration of soluble myosin is necessary for the manufacture of sausages, when the level thereof is too low, severe water and fat separation results in the finished product. Such loss in soluble myosin may be largely or entirely prevented by treating the meat with water-soluble polyphosphates including one or more of the following:

(1) The sodium, potassium and ammonium salts of polyphosphoric acid;
(2) The sodium, potassium and ammonium salts of pyrophosphoric acid.

The preferred polyphosphates include tetrasodium pyrophosphate, tetrapotassium pyrophosphate, sodium tripolyphosphate and potassium tripolyphosphate. Because of availability in food grade quality at reasonable cost, tetrasodium pyrophosphate and sodium tripolyphosphate are presently preferred for commercial production. However, the corresponding potassium salts are very attractive because of their high solubilities. Also tetraammonium pyrophosphate and ammonium tripolyphosphate may be used if desired.

It appears that the water-soluble polyphosphate salts, such as mentioned above, will not only prevent loss or impairment of the fat-water binding properties of raw meat before it undergoes rigor mortis, but even where rigor mortis has taken place these water-soluble polyphosphates have the ability to restore the water and fat binding properties. Accordingly, the water-soluble polyphosphates may be incorporated into the meat either before, during or after rigor mortis.

While, within certain limits, improved or enhanced results may be obtained by using increased amounts of the water-soluble polyphosphates, ordinarily it is preferred to use the minimum amounts consistent with obtaining adequate improvement in water and fat binding properties.

Experiments have established that the binding properties of meat in sausage and ground meat products are largely due to its content of a particular type of protein which is called myosin. The proteins of meat may be classified in three groups for the purposes of the present discussion. These three groups are:

(1) Proteins soluble in distilled water;
(2) Proteins soluble only in salt solutions (e.g. 7% sodium chloride); and
(3) Proteins insoluble in either water or salt solution.

Laboratory investigation has shown that only the salt soluble protein, which is referred to as myosin, exhibits binding properties in the manufacture of sausage and other ground meat products. In other words, it is only the myosin fraction that contributes binding or emulsion-forming properties. When a sausage batter is chopped, the myosin present in the meat tends to dissolve in the salt and water present so as to surround each fat particle. Subsequently, when the sausage or ground meat product is cooked, the myosin sets or coagulates to a gel similar to cooked egg white and in this form locks in, or enmeshes, the fat particles. If sufficient myosin is present, it will bind or emulsify all the fat so that there will be no fat separation in the ground meat product.

The object of the present invention, generally stated, is the provision of sausages made from skeletal tissue, such as wieners and Bologna encased in impermeable sausage casings such as Saran film.

More specifically, an object of the invention is the provision of such sausages encased in impermeable casings in which water-soluble polyphosphates are employed in a minor percentage so as to prevent the separation of fat and water which would otherwise occur in such sausages.

Certain other objects of the invention will, in part, be obvious and will, in part, appear hereinafter.

For a more complete understanding of the nature and scope of the invention, reference may now be had to the following detailed description thereof wherein illustrative examples are set forth.

As stated above, the myosin content of the ground meat serves as a measure or indication of the water and fat binding capabilities or potential of the ground meat when used in the manufacture of sausages. One analytical method for determining the myosin content of meat is to chill the specimen to 32° F. and grind it twice through a 1/8" plate of a well-chilled meat grinder with mixing after each pass. A 2 gram sample of the ground meat is extracted by slow stirring for one hour with 35 ml. Weber's solution (0.6 M KCl, 0.04 M $NaHCO_3$, 0.01 M $Na_2CO_3$) at 32° F. Both the salt-soluble (i.e. myosin) and the water-soluble proteins are dissolved in this extraction. A second 2 gram sample is extracted with distilled water instead of Weber's solution, thereby dissolving only the water-soluble protein. The myosin content is taken and defined as the percent (based on the weight of the total protein in the meat) of the protein soluble in Weber's solution minus the percent of protein soluble in distilled water.

As stated above, when meat undergoes rigor mortis its myosin content is substantially decreased reflecting a decrease in the fat and water binding or emulsification properties of the ground meat. The data contained in the following table will serve to illustrate quantitatively the effect of rigor mortis on the myosin content or soluble protein content of ground meat:

TABLE I

*Soluble protein content before and after rigor mortis*

| Sample No. | Type of Meat | Solvent | Percent Soluble Protein |
|---|---|---|---|
| 1 | Inside cow round before rigor | Weber's solution | 44.8 |
| 2 | do | do | 54.7 |
| 3 | do | do | 54.9 |
|   |   |   | [1] 51.4 |
| 4 | Inside cow round after rigor | do | 26.8 |
| 5 | do | do | 29.5 |
| 6 | do | do | 29.1 |
|   |   |   | [1] 28.4 |
| 7 | Ham muscle before rigor | 6% NaCl | 46.6 |
| 8 | do | do | 46.9 |
|   |   |   | [1] 46.8 |
| 9 | Ham muscle after rigor | do | 34.7 |
| 10 | do | do | 27.8 |
|   |   |   | [1] 31.3 |

[1] Average.

The results given in Table I show an average decrease of 23% protein soluble in Weber's solution for inside cow round muscle, and an average decrease of 15.5% of protein soluble in 6% NaCl for ham muscle, after rigor mortis. These decreases are actually much more important and serious than the figures of 23% and 15.5% would indicate. For example, referring to samples Nos. 7 and 9 the 46.6% soluble protein prior to rigor mortis is composed of 23.2% protein soluble in distilled water and 23.4% soluble in the salt solution. The latter is the myosin (and actomyosin) which are the proteins which have the binding and emulsifying properties useful for sausage making. Now the figure of 34.7% soluble protein after rigor mortis is composed of 21.9% protein soluble in distilled water (viz. a decrease of only 1.3%) and only 12.8% protein soluble in the salt solution (viz. a decrease of 10.6%). Thus the decrease or loss in myosin content due to rigor mortis is about 46%. This in effect means that the binding or emulsifying power and value of the meat is approximately halved after rigor mortis.

In view of the discovery that the addition of water-soluble phosphates would eliminate or minimize the deleterious effect of rigor mortis on the water and fat binding properties of meat, it was further discovered that sausages made from muscle or skeletal tissue such as wieners and Bologna sausage, could be satisfactorily encased in impermeable casings such as Saran films. A number of experiments were carried out to evaluate these discoveries and the results thereof are tabulated in the following tables wherein the samples were prepared and the solubility determinations made as described above in connection with Table I.

TABLE II

Use of tetrasodium pyrophosphate to increase the solubility of muscle proteins in Weber's solution

| Muscle Protein Sample No. | Description of Sample | Conc. of Phosphate, g./100 g. Tissue | Protein, Percent Soluble in Weber's Soln. | Soluble [1] Myosin, Percent of Total Protein |
|---|---|---|---|---|
| 1 | Post-rigor frozen cow meat | | 31.8 | 15.6 |
|   | do | 0.20 | 36.4 | 20.2 |
|   | do | 0.35 | 36.7 | 20.5 |
|   | do | 0.50 | 38.7 | 22.5 |
| 2 | Post-rigor frozen cow meat | | 29.8 | 15.0 |
|   | do | 0.35 | 36.2 | 21.4 |
| 3 | Post-rigor frozen cow round | | 36.3 | 14.2 |
|   | do | 0.005 | 41.5 | 19.4 |
|   | do | 0.05 | 47.6 | 25.5 |
|   | do | 0.50 | 52.2 | 30.1 |
| 4 | Post-rigor pork ham | | 40.3 | 18.3 |
|   | do | 0.005 | 43.8 | 22.0 |
|   | do | 0.05 | 50.8 | 29.0 |
|   | do | 0.50 | 54.0 | 32.2 |
| 5 | Pork hearts | | 43.8 | 26.5 |
|   | do | 0.50 | 50.9 | 33.6 |

[1] NOTE.—Percent soluble myosin equals percent total protein soluble in Weber's solution (plus added phosphate ions) minus percent total protein soluble in distilled water (without phosphate ions).

TABLE III

Use of tetrapotassium pyrophosphate to increase the solubility of muscle proteins in Weber's solution

| Muscle Protein Sample No. | Description of Sample | Conc. of Phosphate, g./100 g. Tissue | Protein, Percent Soluble in Weber's Soln. | Soluble [1] Myosin, Percent of Total Protein |
|---|---|---|---|---|
| 3 | Post-rigor frozen cow round | | 36.3 | 14.2 |
|   | do | 0.005 | 40.2 | 18.1 |
|   | do | 0.05 | 47.8 | 25.7 |
|   | do | 0.50 | 50.1 | 28.0 |
| 4 | Post-rigor pork ham | | 40.3 | 18.3 |
|   | do | 0.005 | 40.5 | 18.7 |
|   | do | 0.05 | 48.3 | 26.5 |
|   | do | 0.50 | 53.2 | 31.4 |

TABLE IV

Use of sodium tripolyphosphate to increase the solubility of muscle proteins in Weber's solution

| Muscle Protein Sample No. | Description of Sample | Conc. of Phosphate, g./100 g. Tissue | Protein, Percent Soluble in Weber's Soln. | Soluble Myosin, Percent of Total Protein |
|---|---|---|---|---|
| 4 | Post-rigor pork ham | | 40.3 | 18.5 |
|   | do | 0.005 | 40.6 | 18.8 |
|   | do | 0.05 | 47.4 | 25.6 |
|   | do | 0.5 | 54.9 | 33.1 |
| 5 | Post-rigor pork ham | | 42.8 | 22.2 |
|   | do | 0.005 | 40.3 | 19.7 |
|   | do | 0.025 | 46.8 | 26.2 |
|   | do | 0.050 | 46.2 | 25.6 |
|   | do | 0.120 | 49.9 | 29.3 |
|   | do | 0.250 | 53.5 | 32.9 |
|   | do | 0.500 | 55.9 | 35.9 |
| 6 | Post-rigor frozen cow round | | 37.8 | 14.6 |
|   | do | 0.005 | 40.6 | 17.4 |
|   | do | 0.025 | 45.4 | 22.2 |
|   | do | 0.05 | 47.9 | 24.7 |
|   | do | 0.12 | 51.8 | 28.6 |
|   | do | 0.25 | 53.4 | 30.2 |
|   | do | 0.50 | 52.6 | 29.4 |
| 7 | Post-rigor frozen cow round | | 43.4 | 22.7 |
|   | do | 0.50 | 58.1 | 37.4 |
| 8 | Pre-rigor cow round | | 54.4 | 33.4 |
|   | do | 0.50 | 55.4 | 34.4 |
| 9 | Pre-rigor cow meat | | 44.6 | 27.6 |
|   | do | 0.50 | 48.2 | 31.2 |
| 10 | Pre-rigor cow meat | | 36.2 | 17.2 |
|   | do | 0.50 | 46.2 | 29.0 |

The following examples will serve to both illustrate specific practical embodiments of the invention and also the improvements obtained thereby.

EXAMPLE 1.—TO DETERMINE THE AMOUNT OF TETRA SODIUM PYROPHOSPHATE REQUIRED TO PREVENT WATER SEPARATION IN SARAN ENCASED BOLOGNA MANUFACTURED FROM REGULAR POST-RIGOR COW MEAT

Experimental procedure:
Basic formula for Saran encased Bologna—

Ingredient:
Frozen cow meat, chipped _____ pounds __ 15.5
Beef trimmings, 75% lean _____ do ____ 3.5
Regular pork trimmings, 50% lean, 45° F.
                                      pounds __ 5.0
Regular pork trimmings, 50% lean, 110° F.
                                      pounds __ 8.0
Smoked bacon ends, 110° F. _____ do ____ 3.0

Total meat _____ do ____ 35.0

Water _____ do ____ 3.5
Spice mix _____ do ____ 1.04
Cure mix _____ do ____ 0.39
Ascorbic acid solution _____ milliliters __ 70

Each test lot was chopped on the silent cutter to a final batter temperature of 62° to 67° F., stuffed into 8 oz. Saran tubes and cooked in 160° F. water for 1 hours.
Results:

| Bologna Test Lot No | 1 | 2 | 3 | 4 |
|---|---|---|---|---|
| Percent tetrasodium pyrophosphate (based on total meat formula) | | 0.089 | 0.159 | 0.213 |
| Percent soluble myosin in cow meat (with correct amount pyrophosphate added) | 15.6 | 20.2 | 20.5 | 22.5 |
| Percent water separation in final product | 1.05 | 0.38 | 0.02 | 0.15 |

Conclusions:
(1) The addition of 0.16% to 0.21% tetrasodium pyrophosphate to Saran sausage batter during chopping reduces the amount of water separation and makes it possible to use regular post-rigor cow meat in place of hot boned pre-rigor cow meat.

EXAMPLE 2.—USE OF TETRASODIUM PYROPHOSPHATE TO INCREASE THE AMOUNT OF ADDED WATER IN SARAN ENCASED SAUSAGE MANUFACTURED WITH POST-RIGOR COW MEAT

Experimental procedure:

Saran Bologna formula—The same basic Bologna formula was used as in Example 1 with 0.16% tetrasodium pyrophosphate added to each batch, except the control, at the time of chopping. Four test lots were chopped with varying amounts of added water.

Results:

| Bologna Test Lot No | 1 | 2 | 3 | 4 |
|---|---|---|---|---|
| Percent tetrasodium pyrophosphate added (based on total weight meat) | Percent | Percent 0.16 | Percent 0.16 | Percent 0.16 |
| Water, percent of total weight meat | 10 | 10 | 13 | 16 |
| Percent soluble myosin in cow meat used (with correct amount pyrophosphate added) | 15.0 | 21.4 | 21.4 | 21.4 |
| Percent water separation in final product | 1.06 | 0.38 | 0.38 | 0.42 |
| Percent added water by analysis | | | | 8.5 |

Conclusions:

(1) The added water content of Saran sausage manufactured with post-rigor cow meat can be raised to the MIB approved limit (4 times protein plus 10%) by the addition of 0.16% tetrasodium pyrophosphate at the time of chopping.

(2) About 16% to 17% water must be added to the chop, when using the present Bologna formula, to obtain a finished product containing 10% added water by analysis.

EXAMPLE 3.—USE OF TETRASODIUM PYROPHOSPHATE TO INCREASE THE WATER HOLDING CAPACITY OF SARAN ENCASED BOLOGNA MANUFACTURED WITH PRE-RIGOR COW MEAT

Experimental procedure:

Bologna formula—The same basic formula was used as in Example 1 except pre-rigor cow meat was used and the water added to the chop was increased to 5.25 lbs. or 15%. Four test lots were chopped with varying concentrations of tetrasodium pyrophosphate.

Results:

| Bologna Test Lot No | 1 | 2 | 3 | 4 |
|---|---|---|---|---|
| Percent tetrasodium pyrophosphate added (based on total weight meat) | Percent | Percent 0.09 | Percent 0.16 | Percent 0.21 |
| Percent water separation in final product | 0.62 | 0.30 | 0.18 | 0.24 |
| Percent added water by analysis | 7.7 | 8.3 | 7.2 | 8.2 |

Conclusions:

(1) The addition of 0.16% tetrasodium pyrophosphate to the chop makes is possible to increase the added water in Saran Bologna to the MIB approved limit when using pre-rigor cow meat without danger of excessive water separation.

EXAMPLE 4

Saran encased ham and cheese roll formula:

Ingredient:
- Post-rigor frozen ham (80% lean) _pounds__ 15.6
- Post-rigor ham 45° F. (80% lean) ___do____ 5.2
- Post-rigor ham 90° F. (80% lean) ___do____ 5.2
- Smoked boiled ham _____do____ 3.25
- Diced processed cheese _____do____ 3.25

Total meat _____do____ 32.50

- Spice and cure mix _____do____ 1.09
- Ascorbic acid solution _____ milliliters__ 65
- Tetrasodium pyrophosphate _____pounds__ 0.056

The ingredients were chopped in a silent cutter as follows:

Frozen ham, spice, cure, ascorbic acid solution and tetrasodium pyrophosphate, chopped 2 minutes; scalded ham and fresh ham added and chopped additional 3 minutes to a batter temperature 45° F.

The batter, smoked boiled ham and diced processed cheese was vacuum mixed for 4 minutes. The resulting mixture was stuffed into 8-oz. Saran tubes and cooked 1 hour in 160° F. water.

Results: Excellent product—no water or fat separation.

It will be understood that the foregoing examples are illustrative and that a number of modifications may be made therein and other embodiments of the invention will be apparent to those skilled in the art. Thus, while it is presently preferred to employ the water-soluble polyphosphates in a concentration of approximately 0.16 to 0.21% based on the total weight of the muscle or skeletal tissue in a sausage formulation, actually smaller or larger percentages may be used with useful results. In general, a concentration of the polyphosphates, even though much smaller than 0.16%, will be beneficial at least to some extent. Concentrations greater than 0.21% may be used if desired but generally concentrations in excess of 0.5% are not required.

Because of its commercial availability at reasonable cost and with excellent quality and uniformity, Saran film constitutes a preferred film from which impermeable sausage casings may be produced for use in practicing the present invention. Saran (polyvinylidene chloride film) is described on pages 391–410, and particularly pages 406–408, of Wakeman, The Chemistry of Commercial Plastics, Rheinhold Publishing Corporation, 1947. As pointed out in this text, the impermeability of Saran film is high and when measured in terms of the rates of transmissivity of helium, hydrogen, carbon dioxide, oxygen and nitrogen at the rate range from not more than 0.70 to less than 0.01 liter per square meter for 24 hours for 125 gauge film.

While Saran film is presently preferred for commercial reasons, it may be replaced by any other impermeable film material either one-ply or in the form of laminations. Included among other films which are useful as impermeable films for sausage casings, there may be included certain types of polyethylene and polyester (Mylar) films.

As mentioned above, the outstanding advantage and property of sausages produced in accordance with the present invention is their excellent keeping properties. For example, whereas ordinary wieners cannot be kept in satisfactory condition, even under refrigeration, for periods of longer than about 2 to 3 weeks at the outside, the Saran encased sausages produced in accordance with the present invention may be kept under similar conditions for months. Since these films at most permit only a very low transmission of air or moisture of the order indicated above, the spoilage is greatly reduced. The extended keeping qualities have obvious economic advantages which have great importance in the sausage industry.

Having fully disclosed the invention and set forth examples teaching and illustrating the presently preferred embodiments thereof, what is claimed as new is:

1. A ground meat batter product in uncooked condition, the meat of said product consisting at least essentially of muscle tissue and at least a substantial portion thereof having been ground subsequent to rigor mortis development, said product being stuffed in a flexible impermeable casing, the water content of said product being that which is present in the final product following heat processing thereof, the product containing a small percentage of water-soluble polyphosphate adequate to at least substantially prevent fat-water separation in said product during heat processing thereof.

2. The product of claim 1 wherein said flexible impermeable casing is formed from polyvinylidene chloride film.

3. A ground meat batter product in uncooked condition, the meat of said product consisting at least essentially of muscle tissue and at least a substantial portion thereof having been ground subsequent to rigor mortis development, said meat being stuffed in a flexible impermeable casing, the water content of said product being that which is present in the final product following heat processing thereof, the product containing up to 0.5% of water-soluble polyphosphate to at least substantially prevent fat-water separation in said product during heat processing thereof.

4. A ground meat batter product in uncooked condition, the meat of said product consisting at least essentially of muscle tissue and at least a substantial portion thereof having been ground subsequent to rigor mortis development, said product being stuffed in a flexible impermeable casing, the water content of said product being that which is present in the final product following heat processing thereof, the product containing from about 0.16% to 0.21% of water-soluble polyphosphate selected from the group consisting of tetrasodium pyrophosphate, tetrapotassium pyrophosphate, tetraammonium pyrophosphate, sodium tripolyphosphate, potassium tripolyphosphate and ammonium tripolyphosphate to at least substantially prevent fat-water separation in said product during heat processing thereof.

References Cited in the file of this patent

UNITED STATES PATENTS

| 2,513,094 | Hall | June 27, 1950 |
| 2,545,243 | Rumsey | Mar. 13, 1951 |

FOREIGN PATENTS

| 696,617 | Great Britain | Sept. 2, 1953 |

OTHER REFERENCES

"Refrigerating Engineering," February 1954, p. 46, article entitled Packaging and Wrapping Materials.